G. W. Parrott,
Shoe-Sole Machine,
N° 27,306.  Patented Feb. 28, 1860.
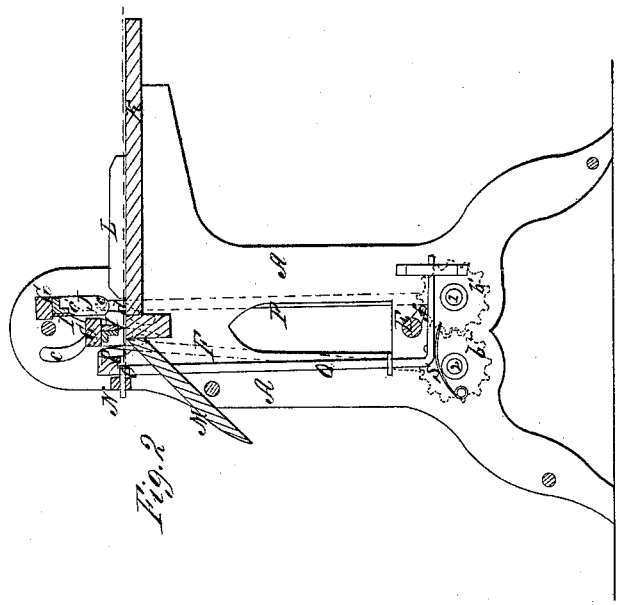
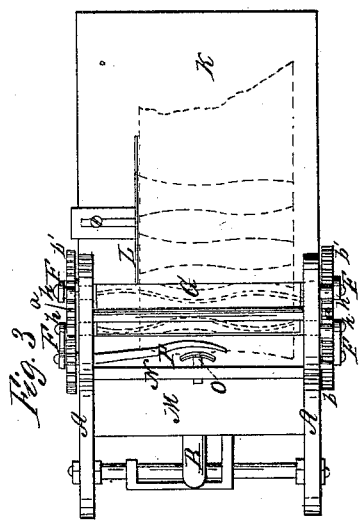
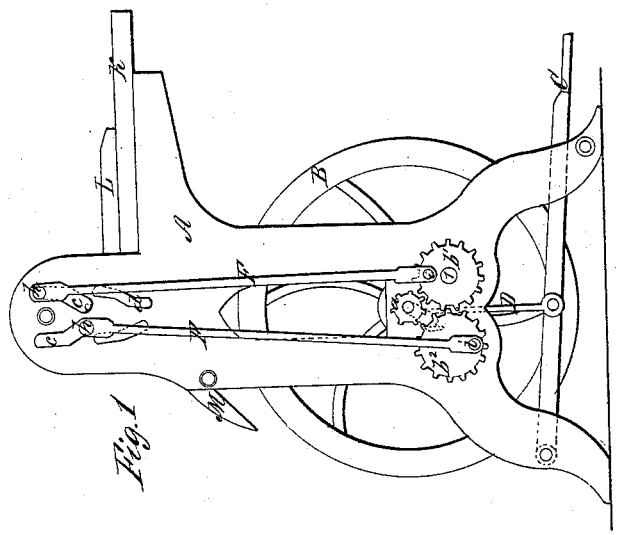
Witnesses:
Sam Cooper
Thos. L. Glover
Inventor:
G. W. Parrott

UNITED STATES PATENT OFFICE.

G. W. PARROTT, OF LYNN, MASSACHUSETTS.

SOLE-CUTTING MACHINE.

Specification of Letters Patent No. 27,306, dated February 28, 1860.

*To all whom it may concern:*

Be it known that I, G. W. PARROTT, of Lynn, in the county of Essex and State of Massachusetts, have invented an Improved Method of Operating the Knives of Sole-Cutting Machines, of which the following is a full, clear, and exact description, reference being had to the accompanying drawings, in which—

Figure 1, is a side elevation of a sole cutting machine with my improvements attached; Fig. 2 a longitudinal vertical central section through the same; Fig. 3 a plan.

The perfect operation of machines of this class is dependent upon several contingencies among which may be enumerated the following: It is necessary, 1st, that each knife fall undeviatingly and unerringly over the same point each time it descends; 2nd, that the knives descend vertically through the whole time of making a cut; 3rd, that they pass each other as they rise and descend without interfering with each other; 4th, that these ends be accomplished with the least practicable complication and cost and without depriving the machine of that compactness and lightness necessary to insure its introduction into use.

My invention has for its object to accomplish all these ends and consists in governing the position of the knife bar and knife during their motions by means of an arm projecting from the knife bar and guided by a slot or its equivalent as will now be more fully described.

The driving shaft E, runs in bearings in the frame work A, and is rotated by the treadle C, through the connecting rod D, and a crank upon the shaft seen dotted in Fig. 1. The fly wheel B, is secured to the shaft, E, near its center $a$, are pinions one upon each end of the shaft E, which engage with wheels $b'$ upon opposite ends of the shaft 1, the latter wheels engage with two similar wheels $b^2$ upon a shaft 2, and thus as the treadle is operated the wheels $b'$, $b^2$ are rotated. From the wheels $b'$ $b^2$ project the crank pins $i$ which are connected by means of the pitmen F with the cutter heads G. These cutter heads are seen in section in Fig. 2 and have each a knife I, of the form ordinarily employed in sole cutting machines attached to its under side. By means of the connection of the cutter heads or bars G with the wheels $b'$, $b^2$, the former are brought alternately down and for the purpose of guiding them in their descent, pins $h$, projecting from the treads of the cutter bars run in slots $c$, in the frame work. The pins $h$ pass through the slots and the pitmen F by which the knives are actuated are attached to them as seen in Fig. 1. The bottom of the slots $c$, approach so near to each other that the knives shall descend each time over the same line while at the top they diverge sufficiently to allow the knife heads to pass each other.

In order that the knives may be maintained in a vertical position necessary to enable them to pass each other without interfering—and also for the purpose of insuring their descent vertically while they are passing through the leather I adopt the following means of governing their motion—a bar J, descending from each of the cutter bars G, carries a pin $e$, at its lower extremity which plays in a slot $d$, immediately beneath the slot $c$, the lower portions of the slots $c$, and $d$, being so formed with respect to each other that as the crank pins $i$, descend to make the cut, the knives shall descend vertically and make a clean cut through the leather.

It is obvious that the upper slot $c$, may be dispensed with, and that any other method of hanging the arm may be adopted provided this descent be rigidly governed by means of the arm J, and lower slot $d$; the length of the arm J, being such that any looseness of its pin $e$, in its slot $d$ occasioned by wear of the parts, shall have no appreciable affect upon the knife, to cause or even permit its descent in other than an unvarying vertical direction. It is also evident that in lieu of making the slots $d$ in the frame as above described they may be made in the bar J, and a pin projecting from the frame work into the slot in the bar be used in a manner precisely similar, to govern the motion of the knives.

K is the bed plate on which the leather to be cut is placed and L an adjustable gage which governs the position of the leather upon the bed plate. To one end of the plate K, is attached the inclined board M, and a cross bar N which carries at its center a curved stop O, which is placed upon a level with the upper surface of the bed plate K Fig. 2. Between this stop and the knives is a horizontal bar or rod P, attached to a vertical rod Q the lower end of which is bent horizontally and rests upon a spring S.

A spur or projection $f$, attached to the shaft E, strikes against the rod Q and depresses it each time the shaft is revolved.

The operation is as follows: The treadle C, is operated by the foot and the leather from which the soles are to be cut is placed upon the bed plate K, against the gage L. As one cutter rises the other descends, the slot $d$ and pin $e$ guiding it as before stated so as to cause it to descend constantly over the same line and vertically while it is making its cut. The knives are curved as is customary in such machines so that one shall cut one side of a sole and the other the opposite side, and as they descend alternately, the leather is cut as indicated in red in Fig. 3 the soles having their toes and heels side by side, that is the toe of one sole is between the heels of the two adjoining soles. After each cut the leather is fed by hand against the stop O, and as the shaft E revolves the projection $f$, strikes against the rod Q, and depresses the bar P, by which the recently cut sole is detached from between the stop O, and the knife and thrown down upon the inclined board M.

By adjusting the knives in the customary manner the relative width of the toes and heels may be regulated—and by varying the position of the stop O, and gage L, soles of any required size may be cut.

What I claim as my invention and desire to secure by Letters Patent is—

The bar J, attached to the cutter head in combination with the slot $d$, or its equivalent operating as set forth to govern the motions of the cutter for the purpose specified.

G. W. PARROTT.

Witnesses:
 THOS. R. ROACH,
 P. E. TESCHEMACHER.